(12) United States Patent
Paradzinets

(10) Patent No.: US 11,467,559 B2
(45) Date of Patent: Oct. 11, 2022

(54) CONTROL FOR LASER CUTTING HEAD MOVEMENT IN A CUTTING PROCESS

(71) Applicant: BYSTRONIC LASER AG, Niederönz (CH)

(72) Inventor: Alexandre Paradzinets, Antibes (FR)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 17/597,335

(22) PCT Filed: Aug. 19, 2020

(86) PCT No.: PCT/EP2020/073247
§ 371 (c)(1),
(2) Date: Jan. 3, 2022

(87) PCT Pub. No.: WO2021/037641
PCT Pub. Date: Mar. 4, 2021

(65) Prior Publication Data
US 2022/0244705 A1    Aug. 4, 2022

(30) Foreign Application Priority Data

Aug. 28, 2019 (EP) .................................... 19194078

(51) Int. Cl.
*G05B 19/4093* (2006.01)
*G05B 19/408* (2006.01)
*G06N 3/08* (2006.01)

(52) U.S. Cl.
CPC ... *G05B 19/40937* (2013.01); *G05B 19/4083* (2013.01); *G06N 3/08* (2013.01);
(Continued)

(58) Field of Classification Search
CPC .......... G05B 19/40937; G05B 19/4083; G05B 2219/35162; G05B 2219/36056; G05B 2219/45041; G06N 3/08
(Continued)

(56) References Cited

U.S. PATENT DOCUMENTS

2002/0198622 A1* 12/2002 Dinauer ............... B23K 26/082
219/121.79
2011/0284512 A1   11/2011 Stork Genannt Wersborg
(Continued)

OTHER PUBLICATIONS

Hado Van Hasselt et al., "Deep Reinforcement Learning with Double Q-Learning", Dec. 8, 2015, pp. 1-13, XP055317413.
(Continued)

*Primary Examiner* — Sean Shechtman
(74) *Attorney, Agent, or Firm* — Workman Nydegger

(57) ABSTRACT

In one aspect the invention relates to a method for calculating control instructions (CI) for controlling a cutting head (H) of a laser machine (L) for cutting a set of contours in a workpiece. The method comprises reading (S71) an encoded cutting plan (P), and continuously determining a state (S73) relating to the processing of the workpiece by the laser machine (L) by means of a set of sensor signals (sens). Further, the method provides a computer-implemented decision agent (DA), which dynamically calculates an action (a) for the machining head (H) to be taken next and based thereon providing control instructions (CI) for executing the processing plan (P) by accessing a trained model with the encoded cutting plan (P) and with the determined state (s).

12 Claims, 7 Drawing Sheets

(52) U.S. Cl.
CPC .............. *G05B 2219/35162* (2013.01); *G05B 2219/36056* (2013.01); *G05B 2219/45041* (2013.01)

(58) Field of Classification Search
USPC ................................. 700/166, 173, 174, 187
See application file for complete search history.

(56) References Cited

U.S. PATENT DOCUMENTS

| | | |
|---|---|---|
| 2015/0100530 A1 | 4/2015 | MNih et al. |
| 2017/0270434 A1 | 9/2017 | Takigawa et al. |
| 2018/0169856 A1 | 6/2018 | Murakami et al. |

OTHER PUBLICATIONS

International Search Report and Written Opinion, dated Oct. 23, 2020, from PCT/EP2020/073247 filed Aug. 19, 2020.
International Preliminary Report on Patentability, dated Nov. 16, 2021, from PCT/EP2020/073247 filed Aug. 19, 2020.

\* cited by examiner

CONTROL FOR LASER CUTTING HEAD MOVEMENT IN A CUTTING PROCESS

The present invention relates to a method for calculating control instructions for control of a cutting head of a laser cutting machine, a machine learning device and a decision agent in such a machine learning device and a respective computer program.

Today laser cutting machines are widely used in metal sheet industry. Typical operation of such machine is to execute cutting one-by-one of independent typically closed contours in order to separate work parts from a workpiece. The operation is associated with injecting of heat energy into a workpiece (local heating), applying the cutting gas jet and mechanical movement of a cutting head. Having these operations, the notion of cutting sequence is very important in the cutting process. The major performance criteria are directly impacted by the cutting sequence: total cycle time (processing time of a cutting job), risk of collisions between mechanically moving cutting head and parts which are already separated and potentially titled, overheating of certain zones of the workpiece, mechanical lifetime of the machine parts etc. If the shortest processing path and collision avoidance seem to be resolved problems, the best processing sequence taking into account heat distribution in the material (especially in combination with the path optimization and collision avoidance) is a much more complex problem because of the high degree of freedom. Costly computations are required for the estimation of heat distribution (typically off-line finite elements (FE) simulation). This makes the finding of a better than 'next closest available neighbor' cutting strategy impossible for a typical machine controller in a reasonable time. Cutting path optimization per se, is an NP-hard problem of combinatorial optimization.

As illustrated in FIG. 1, a typical machining plan 1 is composed of work parts 2. Standard machining sequence 3 that the machine controller would apply is of type 'next closest available neighbor' and arranged in lines. This sequence does not take into account any of the aforementioned problems of workpiece overheating, not overdriving of cut parts. Although some heuristic rules could be applied to improve the standard machining sequence, these rules might not be applicable on different machining plans layouts. Since the problem of machining sequence is a problem of combinatorial optimization of complexity n!, with using of heuristic rules the chance to have a situation which is worse than a standard machining sequence at the end of machining process is extremely high. Resolving the travelling salesman problem (TSP) using machine learning is widely known in scientific literature [Bello et al. 2017, *Neural Combinatorial Optimization with Reinforcement Learning*]. Compared to our problem, the problem of travelling salesman is purely algorithmic and consists of finding of the shortest Hamiltonian path in a weighted graph where travel roads (graph edges) are stateless (independent from the history). With other words, the travelling salesman problem remains static during the course of processing, whereas the problem to be solved in the present invention is dynamic and after each piece which has been cut, the remaining situation for the rest of the pieces has changed. The case graphs for TSP where it changes over time is known in the literature as temporal graphs [O. Michail, *An Introduction to Temporal Graphs: An Algorithmic Perspective*]. Solving TSP in temporal graphs shows increased complexity compared to the static case and reduced chance to have a polynomial time approximated solution.

Further, US 2017/0270434 A1 discloses a machine learning apparatus used for calculating condition data of a laser machining system.

US 2011/0284512 A1 discloses a method for monitoring a laser machining operation by means of characteristic values from sensors, represented by a fingerprint. An artificial neural network may be used for data processing.

In the paper "Deep Reinforcement Learning with Double Q-Learning", H. van Hasselt et al., 8 Dec. 2015, pages 1-13, XP055317414, a Q-learning algorithm, in particular a double Q-learning algorithm, is discussed with reference to the problem of overestimation in the context of games in the Atari 2600 domain.

Therefore, there is to be solved a dynamic problem in a laser processing machine, wherein the possibility to travel to the next part is changing with time dependent on real time state observation from the machine.

The US patent publication US 2018/0169856 A1 describes a machine learning method and a machine learning device destined to optimize the trajectory of a welding robot taking into account such criteria as total processing time, time spent in processing area, robot drives current. Unlike the problem addressed in the patent application US 2018/0169856 A1, the problem, which needs to be resolved in laser cutting, is not only to optimize the total processing time or axis drives working current. Laser cutting process differs from welding by the following aspects:

- During the cutting process workparts are physically detached from the workpiece. With thin metal sheet material the risk that the separated parts are standing (tilting) and thus creating a collision risk (when the cutting head of the laser machine collides with a tilted part) is very high. This problem is resolved by the present invention.
- During the cutting process a heat accumulation occurs which reduces the cutting quality in thick material. This problem needs to be taken into account and is resolved with the approach presented herein.

It is therefore an object of the present invention to provide a solution for the problems mentioned above. In particular, the collision risk of tilted parts should be avoided and heat accumulation should be taken into account when calculating an action sequence for the laser machine head.

This object is solved by a method for calculating control instructions, by a machine learning device, by a decision agent, and by a computer program according to the appended independent claims. Advantageous aspects, features and embodiments are described in the dependent claims and in the following description together with advantages.

According to a first aspect the invention relates to a method for calculating control instructions for controlling a machining head (i.a. cutting head) of a laser machine. The method is computer-implemented and comprises the following steps:

Reading or receiving an encoded processing plan, in particular a cutting plan. The cutting plan is data structure with data, defining what and how the workpiece is to be processed, i.e. where and how the cuts have to be executed and which form of the cut should be used. Usually, a workpiece is to be processed as efficient as possible and thus as many as possible cuts should be applied in order to get as many as possible cut workparts form the original workpiece. The processing plan, however, does not define the machining sequence, representing a sequence of cuts and thus a cutting path, e.g. defining which cut has to be executed first and which cut second and so forth.

Continuously determining a state relating to the processing of the workpiece by means of a set of sensor signals, for example optical sensor signals, e.g. taken by an infrared camera;

Providing a computer-implemented decision agent, which dynamically calculates an action for the machining head to be taken next and based thereon providing control instructions for executing the processing plan by accessing a trained model with the encoded cutting plan and with the determined state.

In a preferred embodiment, the model or neural network receives as input the state (in particular in form of a multi-layer image, preferably a multi-layer image matrix) and the encoded cutting plan, and provides as output an action to be forwarded to the machine learning device for being executed next. The neural model or model, thus, works on digital in particular optical input and more particularly on a graphical input. E.g. the cutting plan may be provided as graphical input, too.

According to another preferred embodiment a reward function and respective module is provided, which is adapted that after execution of each action, the action will receive a reward based on received sensor signals and wherein the decision agent executes an optimization function in order to maximize a global reward for all actions.

According to another preferred embodiment, the state represents or comprises a state of the laser machine, a state of the workparts already processed, and a state of the workparts which still need to be processed and may in addition represent a state of the workpiece. Thus, the state dynamically changes over time and in particular after an action of the laser machine was executed on the workpiece and more particular after each cut of a workpart. This adds complexity to the problem solution as much more computations need to be carried out in comparison to a static state which does not change over time.

A state observation unit for the determining the state may e.g. be implemented by means of optical sensor signals of the actual machining situation (cutting situation). In a preferred embodiment, observation may be resulted from an infrared (IR) camera observation (heat map recorded in real time during machining), material deformation, observed collision risk (tilted parts), cumulated machining time, drives temperature, and others. The list is not limited to this specific sensor signals and may be extended. In another preferred embodiment, not only images may be provided as input for processing, but also digital data from a file. E.g. the cutting plan may be provided in a vector graphical format or as pixel data in an image file. Thus, optical signals and/or images may be processed for state determination. Preferably, several different optical inputs, in particular two different inputs are processed. In a preferred embodiment, a first image is provided which serves as a first input, representing the actual cutting situation and cutting success with already cut part and parts which still need to be cut. The image changes after each finalization of a cut part. In addition, a second image is provided which serves as a second input, representing a heat distribution in the workpiece and/or in the cut parts. The second image is an important information for evaluating quality of the cutting process. Both, the first input and the second input are processed for state determination.

According to still another preferred embodiment, after and/or during execution of an action by the laser machine, experience data are aggregated. Experience data refer to digital data of recorded observations from a set of sensors, relating to the laser machine (comprising the determined state). The experience data are aggregated and are fed back (as feedback) to the model or network in order to continuously improve the same (in particular to improve the learning capabilities of the model). Feeding back the recorded observations allows the machine to penalize the elements of the generated solution and do further exploration of the search space in case of negative feedback and on the contrary stabilize the exiting solution as the optimal one in case of positive feedback. It is in particular important for different physical machines to be able to self-adapt its machining process ('learn' form the experience) as every physical machine could have slight variations of conditions such as for example ventilation as well as assembly variations.

In another preferred embodiment the state refers to or comprises an optical state (which is recorded by optical sensors) and may be represented in form of a multi-layer image and/or as graphics. The multi-layer image or multi-layer image matrix comprises two different parameters:

1. A first layer image of the workpiece being processed in which the already processed parts are differentiable from the still unprocessed parts (in particular already executed cuts of the cutting plan may be distinguished from cuts that still need to be executed by automatic object recognition tools, e.g. algorithms) and
2. a second layer image of the workpiece, in which a heat map of workpiece is represented being processed according to the cutting plan. In a preferred embodiment, the second layer image may be acquired by means of an infrared camera, representing the spatial and/or local heat distribution during or shortly after cutting.

This feature has the important technical advantage that both aspects and thus all relevant information may be considered (i.e. problems caused by cut and tilted parts and quality problems due to overheating) when determining the next action, in particular an optimal cutting sequence.

The term "action" is to be construed as a set of process control instructions for controlling the cutting head of the laser. An action may thus refer to a sequence of cutting steps (perhaps the original cutting plan needs to be changed), a feed rate for the motor drive, defining the cutting speed (or jerk or acceleration), a focus shift or other settings of cutting parameters.

In a preferred embodiment, computer vision algorithms are executed for differentiating between already processed parts and still to be processed parts. Here object segmentation algorithms and/or object detection algorithms may be executed.

In another preferred embodiment, the two different input layers of the multi-layer image matrix may be aggregated into one single two-part composition. The two-part composition is a digital dataset, representing both, the heat distribution information and the processing status information (parts to be processed and which still need to be processed). The two different input layers of the multi-layer image matrix may be provided as overlay image, comprising both types of information or may be combined in an alternative manner.

The term "state" is to be construed as digital dataset, representing the state of the laser processing, in particular cutting. The state, thus, has a temporal indication as the state evolves dynamically and differs in time as laser cutting proceeds. The state preferably has two separate components as indicated above. First, the state may be related to the cutting plan in order to detect which parts of the cutting plan have already been executed and which parts have not (and still have to be cut). Second, the state may be related to the local heat distribution in the cutting zone.

According to another preferred embodiment the reward function is selected from the group consisting of:
cutting time reward function,
heat optimization reward function,
integral measure of the temperature reward function and
collision avoidance reward function.

The cutting time reward function rewards those actions according to which the cutting time may be optimized. The heat optimization reward function rewards those actions according to which quality of the cutting process is optimized in that overheating issues are avoided or at least reduced as much as possible. The integral measure of the temperature reward function improves the quality of the cutting process over time. The collision avoidance reward function avoids collision issues, in particular between the cutting head of the laser machine or other parts thereof and already cut parts (which may be tilted or fallen out of the rest grid-like structure of the workpiece).

This feature has the technical advantage that different reward functions may be applied and thus, the different optimization criteria may be selected even during one single processing. In particular, when processing a large workpiece with different cutting orders (multiple zones), e.g. for a first part of the workpiece and for a second part of the workpiece, then different optimization criteria may be chosen, e.g. a first reward function for the first part and a second reward function for the second part which is particularly useful for parts with big amount of inner contours (holes) and within an independent inner optimization. The reward function may be directed to different optimization criteria, as mentioned above. However, in a preferred embodiment, a global reward function is applied, because the goal of optimization is global and usually it is useless to apply different reward functions for each part. The reward function does not act on every independent part unless the part has a lot of inner contours (holes). As mentioned before, in this case it can be useful to apply different reward functions and/or independent inner optimizations as well.

The set of reward functions implements different optimization targets, and more specifically: cutting path optimization, processing time of the cutting job, quality of cut parts etc. as mentioned before.

In another preferred embodiment a specific reward function is determined for a specific processing job or for a specific workpiece or even for a specific part (area) within the workpiece to be processed. This is helpful as one job can have multiple sheets to be cut. Also, the area specific optimization is useful, for example for complex structures.

In another preferred embodiment the reward function may be a linear (or polynomial) combination of all the reward functions mentioned above by using user defined priorities as weights to be applied to the different functions in order to be able to prioritize the different functions according to the actual processing environment.

A self learning agent can be modeled by and/or acts according to a so called Q-table, which may be generated by means of a Q function. The Q-table is formalizing a quality of a state-action combination for calculating the next action for every step of the machining (in particular cutting) process. For more detailed information it is referred to Watkins, C. J. C. H. (1989), *Learning from Delayed Rewards*. Q-table could not be applied to the case of machining sequence since the state-action space is considerably huge.

In a further preferred embodiment, the Q function may be represented by a deep neural network, in particular a deep convolutional network.

In still another preferred embodiment the neural network may make use of an experience replay technique, in particular in the training procedure. For more details of the experience replay technique it is referred to Schaul et al., *Prioritized Experience Replay*, 2015. The experience replay technique (also known as hindsight experience replay technique) is known to be used in order to randomize over the data, thereby removing correlations in the observation sequence and smoothing over changes in the data distribution. By performing experience replay, the agent's experiences (data, states) at each time-step in a data set are stored in a memory for providing feedback for the learning procedure so far. By adding a goal into the input space, it is stated that there are multiple goals for the agent to observe. The new Q-function indicates how good taking each action is, given the current state, to achieving the current goal. For more details it is referred to Mnih et al., *Playing Atari with Deep Reinforcement Learning*, 2013.

Up to now, the invention has been described with respect to the claimed method. Features, advantages or alternative embodiments herein can be assigned to the other claimed objects (e.g. the computer program or to the machine learning device with the decision agent) and vice versa. In other words, the subject matter which is claimed or described with respect to the apparatus can be improved with features described or claimed in the context of the method and vice versa. In this case, the functional features of the method are embodied by structural units of the apparatus and vice versa, respectively. Generally, in computer science a software implementation and a corresponding hardware implementation are equivalent. Thus, for example, a method step for "storing" data may be performed with a storage unit and respective instructions to write data into the storage. For the sake of avoiding redundancy, although the apparatus may also be used in the alternative embodiments described with reference to the method, these embodiments are not explicitly described again for the device.

According to another aspect the invention refers to a machine learning device for al laser machine, in particular a laser cutting machine, being adapted to execute a method as mentioned above. In particular, the machine learning device may comprise
an input interface for receiving an encoded cutting plan;
a further input interface for receiving sensor signals from a set of sensors for continuously determining the state during and/or over the course of cutting and machine execution;
a decision agent; the decision agent may comprise or may access a trained model;
an output interface for providing control instructions for controlling the cutting head of the laser machine.

The machine learning device may in addition comprise or may access a memory. The memory may be adapted for storing data of the agent and/or for storing a trained model.

In preferred embodiments, the machine learning device may be adapted to execute according to the preferred embodiments which have been mentioned before with respect to the method.

In another aspect the invention relates to a decision agent in a machine learning device as mentioned above.

In yet another aspect the invention relates to a computer program comprising program elements which induce a computer to execute the steps of the method for calculating control instructions for controlling a machining head of a laser machine according to the aspects mentioned above, when the program elements are loaded into a memory of the computer. The computer program may be provided as download from an external server to provided locally. The computer program may be stored in a computer-readable medium.

In still another aspect the invention relates to a computer-readable medium on which program elements are stored that can be read and executed by a computer, in order to perform steps of the method for calculating control instructions for controlling a machining head of a laser machine, when the program elements are executed by the computer.

The realization of the invention by a computer program product and/or a computer-readable medium has the advantage that already existing computer entities (microcomputers or processors in the laser machine or relating thereto) can be easily adopted by software updates in order to work as proposed by the invention.

In the following a definition of terms used within this application is given.

The machine learning device for executing the method and for providing the control instructions may be a personal computer or a workstation in a computer network and may include a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory may include read only memory (ROM) and/or random access memory (RAM). A basic input/output system (BIOS), containing basic routines that help to transfer information between elements within the personal computer, such as during start-up, may be stored in ROM. The computer may also include a hard disk drive for reading from and writing to a hard disk, a magnetic disk drive for reading from or writing to a (e.g., removable) magnetic disk, and an optical disk drive for reading from or writing to a removable (magneto) optical disk such as a compact disk or other (magneto) optical media. The hard disk drive, magnetic disk drive, and (magneto) optical disk drive may be coupled with the system bus by a hard disk drive interface, a magnetic disk drive interface, and a (magneto) optical drive interface, respectively. The drives and their associated storage media provide nonvolatile storage of machine readable instructions, data structures, program modules and other data for the computer. Although the exemplary environment described herein employs a hard disk, a removable magnetic disk and a removable (magneto) optical disk, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above. A number of program modules may be stored on the hard disk, magnetic disk, (magneto) optical disk, ROM or RAM, such as an operating system, one or more application programs, like the method for calculating control instructions and/or other program modules, and/or program data for example. A user may enter commands and information into the computer through input devices, such as a keyboard and pointing device, for example. Other input devices such as a microphone, joystick, game pad, satellite dish, scanner, or the like may also be included. These and other input devices are often connected to the processing unit through a serial port interface coupled to the system bus. However, input devices may be connected by other interfaces, such as a parallel port, a game port or a universal serial bus (USB). A monitor (e.g. a GUI) or other type of display device may also be connected to the system bus via an interface, such as a video adapter for example. In addition to the monitor, the computer may include other peripheral output devices, such as speakers and printers for example.

The computer may be operated in a networked environment which defines logical connections to one or more remote computers. The remote computer may be another personal computer, a server, a router, a network PC, a peer device or other common network node, and may include many or all of the elements described above relative to the personal computer. The logical connections include a local area network (LAN) and a wide area network (WAN), an intranet and the Internet.

In a preferred embodiment, the laser machine is a laser cutting machine. However, the solution presented herein may also be applied to other kinds of laser machines.

The decision agent is preferably implemented in software and/or in hardware and is preferably executed on a special graphic processing unit, providing sufficient resources for extensive computations.

The reward module is preferably a software module with logical links to the decision agent and to the laser machine environment as well.

The processing or cutting plan may be provided as an electronic file in a structured manner in order to be able to automatically parse and analyze the data therein. Example of such format may be but not limited to G-Code (or similar) instruction list (text file).

The observation interpretation module serves to interpret and process the sensor signals received from the laser machine in order to generate a state with at least two sub-states. Preferably, the observation interpretation module is implemented as software module. Moreover, the observation interpretation module may comprise a reward module, which preferably also is implemented in software.

The properties, feature and advantages of this invention described above, as well as the manner they are achieved, become clearer and more understandable in the light of the following description and embodiments, which will be described in more detail in the context of the drawings. This following description does not limit the invention on the contained embodiments. Same components or parts can be labeled with the same reference signs in different figures. In general, the figures are not for scale.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DESCRIPTION OF THE EMBODIMENTS

In the present invention proposes to use a machine learning device MLD and a machine learning method to overcome the problem of machining sequence multi-criterial optimization complexity.

Figure 1:
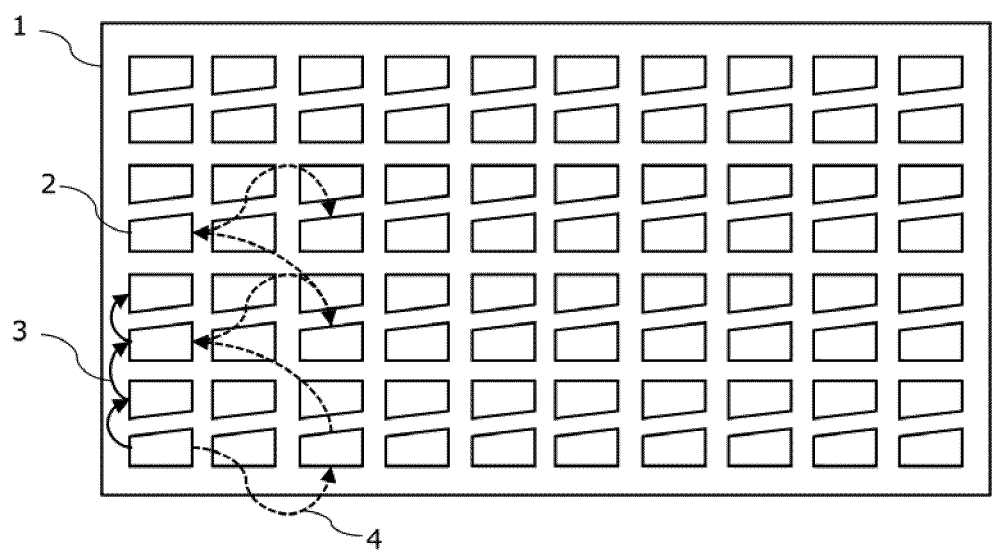
FIG. 1 is schematic representation of a cutting sequence according to a known machine controller of state of the art.
Figure 2:
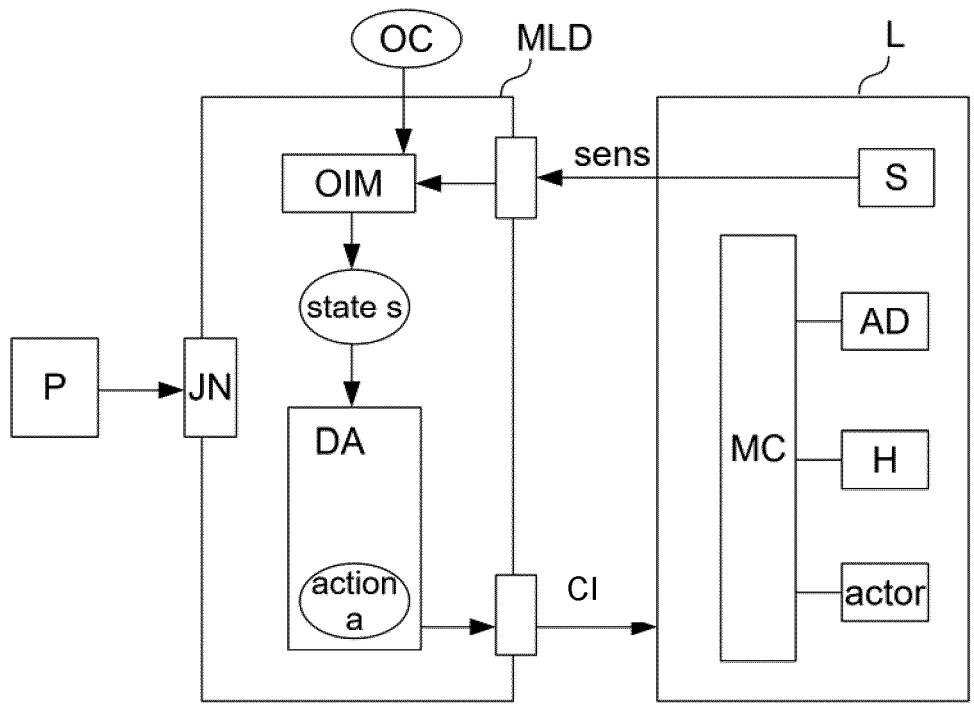
FIG. 2 is an overview of the structural components and architecture of the laser machine environment being controlled by a machine learning device according to a preferred embodiment of the present invention.

As depicted in FIG. 2, the machine learning device MLD interacts and cooperates with a laser machine L and its environment, i.e. further devices, like the gantry for moving the machining head H and external sensors etc. The machine learning device MLD receives sensor signals sens, which have been acquired in the laser's L environment and provides as a result of complex computations control instructions CI to the laser L. The laser machine L comprises a machine controller MC for controlling the cutting process of the laser L with control signals for axe drives AD, for the cutting head H and/or for further actors, e.g. for movement of the gantry or the cutting head H. The laser machine L is equipped with sensors S, which may be located at different positions at the laser machine L. The sensors S may comprise infrared cameras for continuously providing a multi-layer image or multi-layer image matrix of the processing, i.e. cutting environment.

The machine learning device MLD contains an observation interpretation module OIM whose role is to do a mathematical pre-processing and modeling of the sensor signals sens with the observation data received from the machining environment L. The observation interpretation module OIM contains a user configurable reward function module RF which contains at least one optimization criterion OC or a combination of different optimization criteria OC. An optimization criterion OC can be for example safety, machining time, quality. Human experience feedback can also be used as optimization criterion OC, e.g. learn from experienced machine operators, whose experience in formalized and stored in a memory MEM. Decision agent DA is a machine learning mathematical model. The decision agent DA may contain a neural network, a deep neural network, convolutional neural network and/or a recurrent neural network, which is trained to predict future reward and select the best action a for the future machining steps.

In terms of Q learning, the state s of the system is or represents:
1. a digital form of the current layout of the machining plan P distinguishing the parts that have been already processed from the parts that still need to be processed, and
2. a heat distribution map, e.g. observed by means of an IR camera.

More generally, the state s of the system is usually represented as variable structured data (or at least not suitable for input of a neural network). The cutting plan P, processed by a cutting machine is a sequence of geometrical contours which stand for parts including holes in parts. The number of parts per cutting plan is neither fixed nor limited (limited by physical dimensions of the material sheet). The cutting plan P may be received on an input interface JN of the machine learning device MLD.

The first step of state's s preprocessing is to encode the cutting plan P and its current machining progress to a fixed-size matrix suitable for a neural network input. In a preferred embodiment it is considered to make a multi-layer image of fixed size N by M pixels having parts that should be processed in one color and processed parts in another color as a first layer of the multi-layer image or multi-layer image matrix. In applications where heat propagation and material overheating are important, an algorithm is provided in order to update the color of cut parts according to time passed since the part was cut (saturated to a fixed value after some time limit has been reached). The second layer of the multi-layer image or multi-layer image matrix represents the heat map of the cutting plan (pixel value corresponding to measured or simulated temperature). Having big and variable sized images as the input of the neural network, this leads to some practical difficulty of training of the network. To overcome the difficulty, a Variational Autoencoder can be inserter before the decision making neural network. The role of the autoencoder is to shrink the input data space into a smaller sized fixed width vector while implicitly preserving state information of the process.

As possible alternative to the modeling of the state s as multi-layer image or multi-layer image matrix, a structure data embedding or graph neural networks could be applied [see e.g. Scarselli et al. 2009, The Graph Neural Network Model].

The machine controller MC according to the invention is an intelligent machine controller which is used to control the machining process of the machining head H (e.g. cutting head of the laser machine) and coordinate axes drives' AD of the laser machine L. The machine controller MC may work in pair with a machine learning device MLD which may consist of central processing unit CPU and a graphic processing unit GPU for heavy mathematical computations, memory, storage containing trained modes. In a preferred embodiment it is proposed to use Reinforcement Learning or Deep Q-Learning as a machine learning method for the aforementioned machine learning device MLD. For more details relating to Q learning it is referred to US20150100530, which is incorporated herein by reference. Classical Q learning consists of creating a Q table which is the quality of a state-action [s, a] combination (state being the current state of the process and action being a possible next step for the current state). The decision agent DA acts according to the Q table to take decision on every step dynamically. For every step taken the decision agent DA receives a reward from the laser machine's L environment. The goal for decision agent DA is to maximize the total reward for all steps. For that purpose, the Q table is constantly updated using observed sensor signals of the laser L and an assigned or related reward (and the maximum predicted reward for the next step). In case of deep Q learning, the function Q is represented by a deep (convolutional) neural network CNN. An experience replay technique is preferably used to overcome the problem of solution instability due to correlated observations and non-linearity of the neural network.

The space for actions a is formed from the choice of a part to be processing next, including the direction of processing (in case of contour cutting) and the starting point (in case when multiple starting points are possible). For big or continuous action spaces in some cases, the actor critic approach is more suitable. The main difference between Q learning and actor critic is that instead of modeling Q function (which maps state and action axes into quality values) with an artificial neural network (shortly: ANN), the algorithm models the process with 2 ANNs—actor (action as function of state) and critic (value as function of state). At every step the actor predicts the action to take and the critic predicts how good this action could be. Both are trained in parallel. Actor is dependent on critic.

In the case of cutting sequence the critic agent could evaluate a theoretical best future result given the current situation (current state) and an action encoded in a continuous space (next part coordinates on the cutting plan). The optimization process would then need to ask the actor about the next action to take which would lead to a better result.

The experience data delivered by the sensor signals sens (neural network coefficient and other configuration data) is stored on a storage device MEM and may be shared between more than one machining environments via network, shared drives, cloud services or distributed manually by machine technicians.

Figure 3:
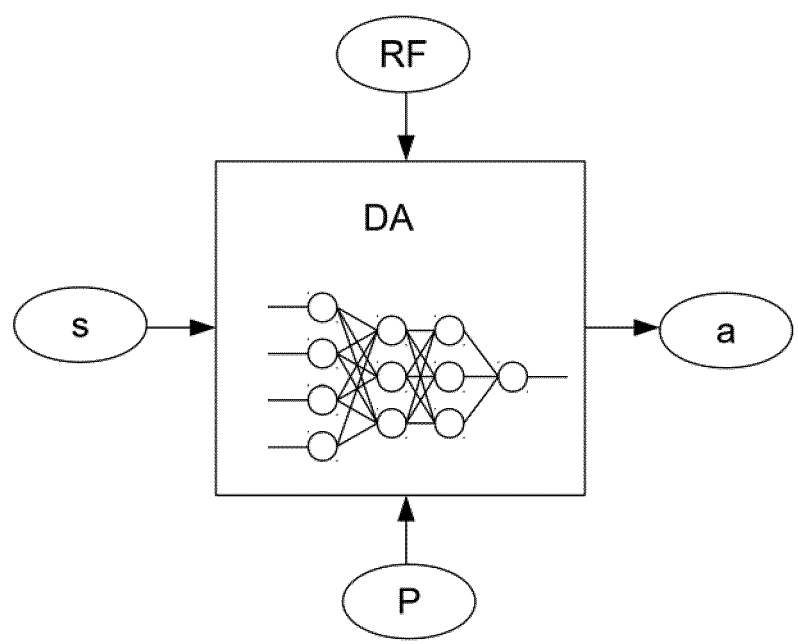
FIG. 3 is a schematic representation of a decision agent according to a preferred embodiment of the present invention.

FIG. 3 represents a structural representation of the decision agent DA with inward and outward messages. The state s of the environment of the laser cutting machine L based on the received sensor signals is calculated. The state represents contours which have already been cut as first part and the heat map of the cutting plan in the present cutting state as second part. The cutting plan P may also be provided to the decision agent DA. The reward function module RF provides a reward function which is applied to the observation data (sensor signals sens). Based on this input data, the decision agent DA provides an action a for the laser machine L (instructed by the machine controller MC) to be taken next.

Figure 4:
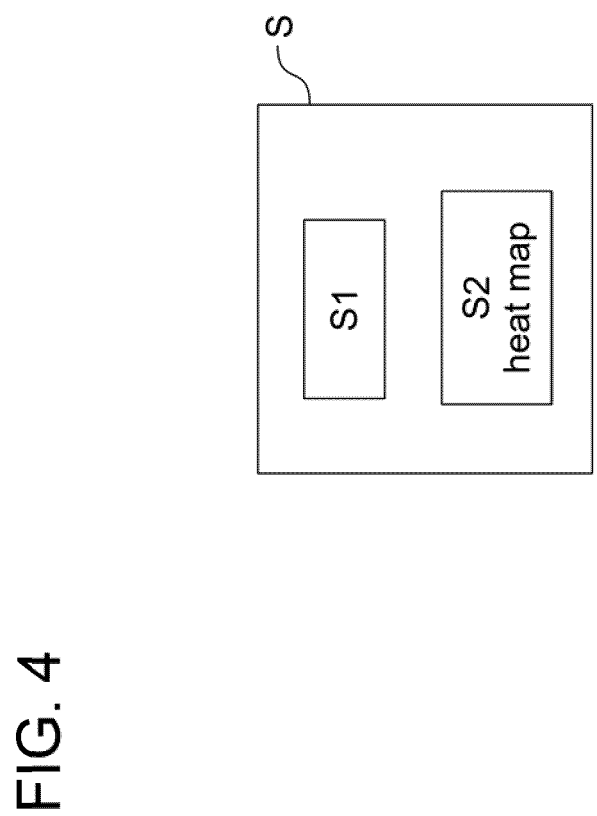
FIG. 4 is a structural representation of a state being processed according to a preferred embodiment of the present invention.

FIG. 4 shows a schematic representation of a state s, which is to be processed by the decision agent DA. The state comprises two sub-states S1, S2. The first sub-state S1 refers to the progress of the cutting job with already processed parts and still to be processed parts. The second sub-state S2 refers to a heat map of the workpiece, representing local injection of heat energy into the workpiece at the cutting position, which reveals possible overheating of zones in the workpiece and/or cut part and serves as a measure for quality.

Figure 5:
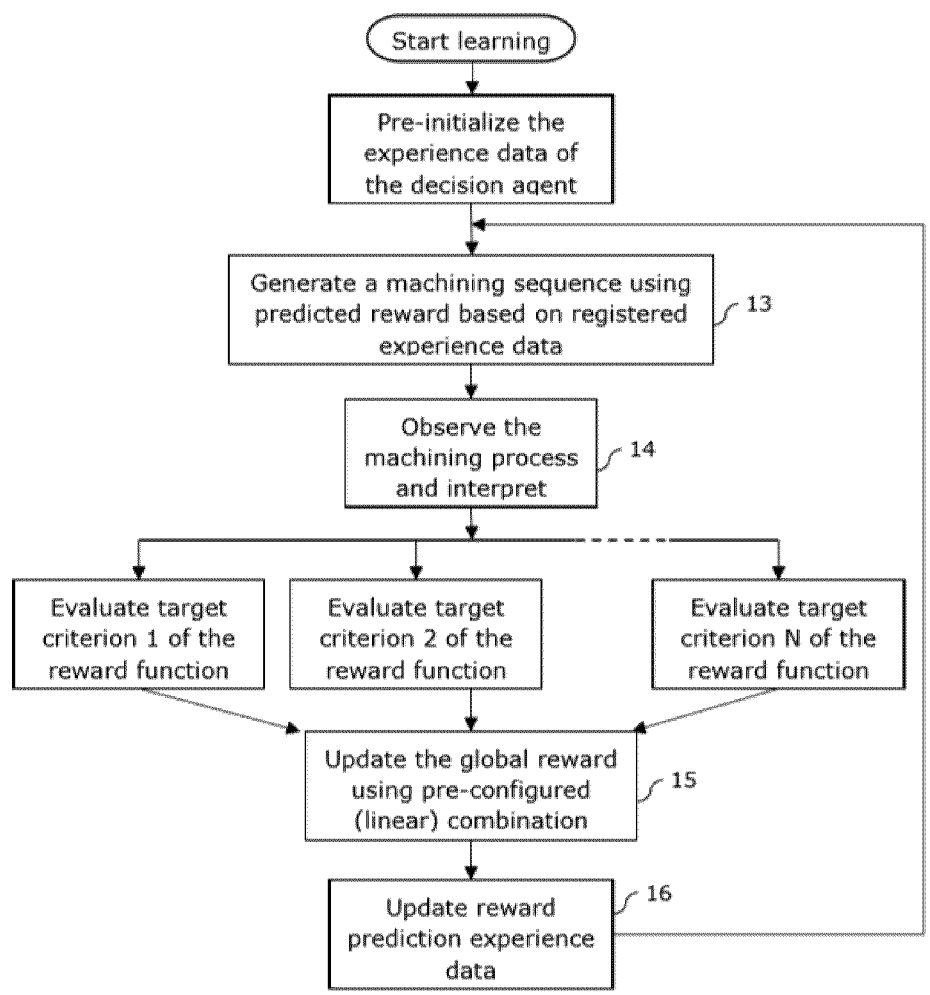
FIG. 5 is a flow chart of a learning method for generating the control instructions for the machining head having the highest reward.

As can be seen in FIG. 5, the learning process consists of generating a machining sequence for the machining head, represented in control instructions CI using the reward prediction decision making agent DA based on its current experience, execute the machining while recording observations (i.e. sensor signals sens, relating to a total machining time, material or workpiece heat map and/or potential collisions etc). The observations are then interpreted in step 14 in order to generate cost or reward functions for every phenomena that the optimization should take care about.

We propose to select from a set of different reward functions for different optimization targets. The cutting time optimization reward function would use the total traveling distance taken with negative sign. The heat optimization reward function would use the maximum reached local temperature taken with negative sign. As alternative, an integral measure of the temperature (or any power function of temperature) along all cutting contours taken with negative sign would be possible, too. For the collision optimization reward function there would be 0 value in case of no collision and a negative constant multiplied by number of eventual collisions.

During the stage 15 the global reward function is calculated as a linear combination (but not limited to) using user preferred weights of priorities. Priorities are set by the operator of the machine according to current needs (safety versus speed, speed versus safety, safety+quality etc). Linear combination coefficients are found empirically. That could for example be:

"distance_reward*1.0+heat_reward*1.0+collision_reward*1.0)" for a balanced optimization, and
"distance_reward*10.0+heat_reward*1.0+collision_reward*1.0" for a speed optimization etc.

After evaluating of local and global reward functions, the experience data of the decision making agent (i.e. weight of the neural network(s) used) are updated during stage 16. It is important to mention, that the execution and observation phase of the learning procedure can be done on a real machine (for example laser cutting machine equipped with corresponding sensors, such as IR optical sensors for thermal imaging, 3D scene reconstruction sensors for potential collision detection, drive current and acceleration sensors and not limited to), as well as in a virtual environment, such as mechanical machine simulation software.

In case of a virtual environment, the observation data are calculated using corresponding simulation techniques (FE method for heat distribution map, mechanical simulation for the tilted part detection etc.). The virtual simulation learning is the preferred one since the learning should be accomplished preferably on a very big number of different machining plans (virtually generated and simulated), typically hundreds of thousands. This impacts the overall performance of the best machining sequence prediction.

Figure 6:
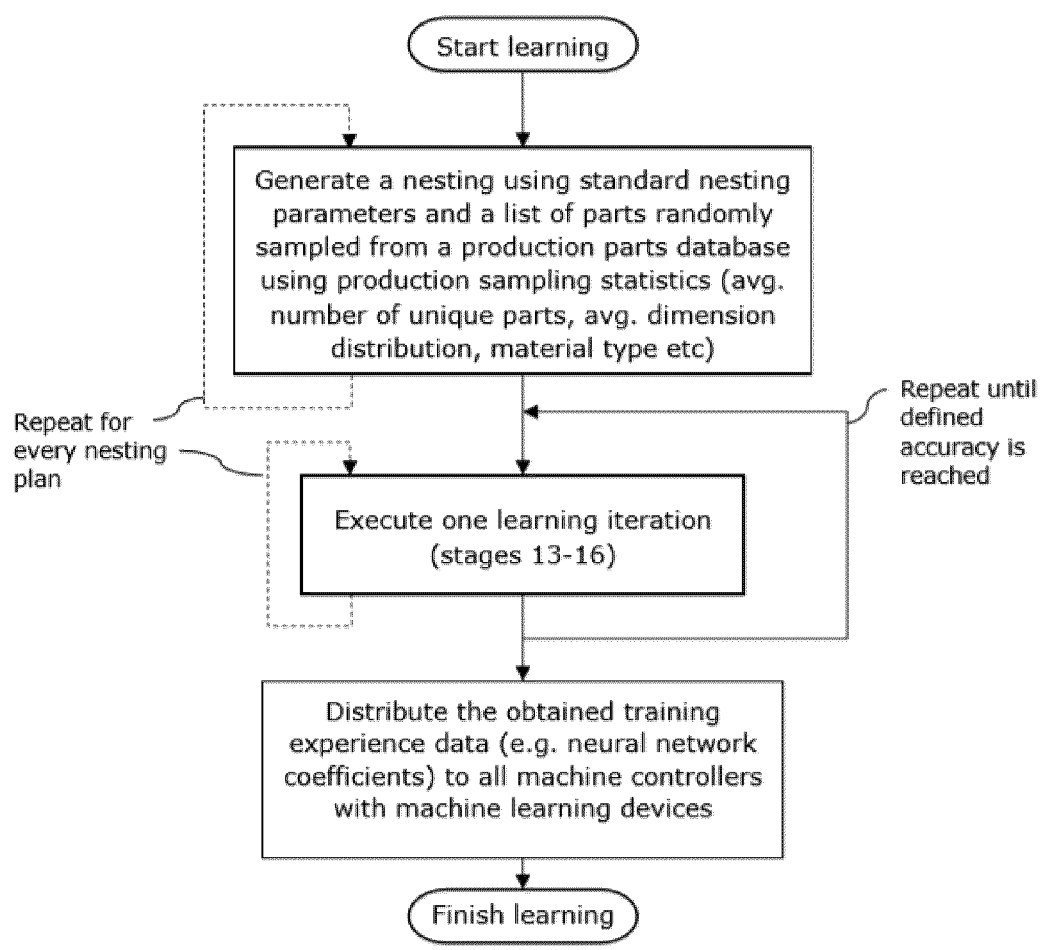
FIG. 6 is another flow chart of a learning procedure for training the model of the decision agent.

FIG. 6 represents a training procedure for training the model or convolutional neural network CNN. After START of the learning and training, a nesting is generated. Please define the term "nesting" in this context!

The nesting may be generated by using standard nesting parameters and a list of parts randomly sampled from a production parts database using production sampling statistics, comprising e.g. average number of unique parts, average dimension distribution, material type etc. Then, the procedure may proceed to executing one learning session, relating to steps 13 to 16 in FIG. 5. After this step, the procedure may proceed to a step for distributing the obtained training experience data (e.g. neural network coefficients) to all machine controllers MC cooperating with machine learning devices MLD.

Figure 7:
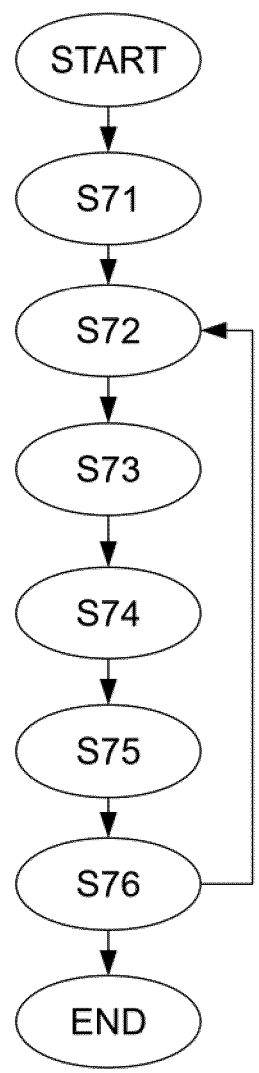
FIG. 7 is a flow chart of a method for calculating control instructions according to a preferred embodiment of the present invention.

FIG. 7 represent another flow chart for generating the control instructions CI used for control of the laser cutting head H by the machine controller MC. After START of the method, in step S71 the cutting plan P is read in. This may be done via the input interface JN. The cutting plan P may be received as file in a structured format. In step S72 sensor signals are received from the environment of the laser machine L. In step S73 a state is determined or calculated, taking into account all the received sensor signals sens. In step S74 an action a to be taken next is calculated by the decision agent DA. Based on the calculated action a, the control instructions CI may be provided in step S75. In a preferred embodiment, the action a is transformed to control instructions CI by using a transfer function. In a simple embodiment, the transfer function is the identity and the action a itself is identical with the control instructions CI to be forwarded to the machine controller MC. In other embodiments, other more complex transfer functions may be applied, e.g. re-formatting, adaption to specifics of the respective laser machine and/or versions of the software installed thereon, applying security functions etc. After having provided the calculated control instructions CI to the machine controller MC, the latter may be instructed to execute the received instructions directly, without further manual input or verification in step S76. During the course of laser machine operation, the sensor signals sens are continuously observed and provided to the decision agent DA (loop in FIG. 7 to step S72).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

A single unit or device, i.a. the decision agent DA or the machine learning device MLD may fulfill the functions of several items recited in the claims. The mere fact that certain measures are recited in mutually different dependent claims does not indicate that a combination of these measures cannot be used to advantage.

The machine learning device MLD for generating control instruction CI in accordance with the method as described above can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantageous which are described with respect to a particular embodiment of present invention or with respect to a particular figure are, wherever applicable, also advantages of other embodiments of the present invention.

The invention claimed is:

1. A computer-implemented method for calculating control instructions for controlling a cutting head of a laser machine to execute an encoded cutting plan for cutting a set of contours in a workpiece in order to separate work parts from the workpiece, comprising the method steps of:
   reading the encoded cutting plan which is a sequence of geometrical contours which stand for the work parts including holes in the work parts;
   continuously determining a state by means of a set of sensor signals, wherein the state comprises a state of the laser machine, a state of the cut work parts, and a state of the workpiece to be cut;
   providing a computer-implemented decision agent, which dynamically calculates an action for the cutting head to be taken next and based thereon providing the control instructions for executing the cutting plan by accessing a trained model with the encoded cutting plan and with the determined state,
   wherein the model receives as input the determined state in form of a multi-layer image matrix, and the encoded cutting plan and provides as output an action to be forwarded to a machine controller on the laser machine for being executed next.

2. The method according to claim 1, wherein after execution of the action, the action will receive a reward based on received sensor signals and wherein the decision agent comprises a reward module for executing an optimization function in order to maximize a global reward for all actions.

3. The method according to claim 1, wherein after and/or during execution of the control instructions by the laser machine based on the calculated action, experience data from the set of sensor signals are aggregated and are fed back to the model in order to continuously improve the model.

4. The method according to claim 1, wherein the determined state is represented in form of the multi-layer image matrix, which at least comprises a first sub-state in form of a layer image of the workpiece being cut in which the already cut work parts are differentiable from the still uncut work parts and a second sub-state in form of a layer image of the workpiece, in which a heat map of workpiece being cut according to the cutting plan is represented.

5. The method according to claim 2, wherein a reward function is selected from the group consisting of: cutting time reward function, heat optimization reward function, integral measure of the temperature reward function and a collision avoidance reward function.

6. The method according to claim 5, wherein the reward function is a linear combination of all the reward functions using user defined priorities as weights.

7. The method according to claim 1, wherein a specific reward function is determined for a specific optimization target.

8. The method according to claim 1, wherein the decision agent, acting as self-learning agent, can be modeled by and/or acts according to a Q-table, which may be generated by means of a Q function, wherein the Q-table formalizes a quality of a state-action combination for evaluating and calculating the next action dynamically for every step of the laser machine.

9. The method according to claim 1, wherein the decision agent implements a Q function, and may be represented by a deep neural network, in particular a deep convolutional neural network (CNN).

10. The method according to claim 1, wherein the decision agent is implemented as at least one neural network and uses an experience replay technique for training.

11. A machine learning device (MLD) being adapted to execute a method according to claim 1, comprising:
   an input interface which is configured for reading the encoded cutting plan which is a sequence of geometrical contours which stand for work parts including holes in the work parts;
   an observation interpretation module (OIM) which is configured for continuously determining the state relating to the cutting of the workpiece by the laser machine by means of a set of sensors;
   a computer-implemented decision agent, which is configured to dynamically calculate an action for the cutting head to be taken next and based thereon to provide control instructions for executing the cutting plan by accessing the trained model with the encoded cutting plan and with the determined state,
   wherein the model is configured to receive as input the determined state in form of a multi-layer image, preferably a multi-layer image matrix, and the encoded cutting plan, and to provide as output the action to be forwarded to a machine controller on the laser machine for being executed next.

12. A computer program comprising program elements which induce a computer to carry out the steps of the method for calculating control instructions for controlling a machining head of a laser machine according to the claim 1, when the program elements are loaded into a non-transitory memory of the computer, wherein the computer comprises a set of sensors which is configured to continuously determine a state of the laser machine by means of a set of sensor signals.

\* \* \* \* \*